United States Patent [19]

Kitani et al.

[11] Patent Number: 4,856,090
[45] Date of Patent: Aug. 8, 1989

[54] LIGHT COMMUNICATION EQUIPMENT

[75] Inventors: Shigehisa Kitani, Chigasaki; Atsuyoshi Sasai; Hirokimi Shimizu, both of Tokyo, all of Japan

[73] Assignee: Canon Kabushiki Kaisha, Tokyo, Japan

[21] Appl. No.: 734,077

[22] Filed: May 15, 1985

[30] Foreign Application Priority Data

| May 22, 1984 | [JP] | Japan | 59-101749 |
| May 22, 1984 | [JP] | Japan | 59-101740 |
| May 22, 1984 | [JP] | Japan | 59-101751 |
| May 22, 1984 | [JP] | Japan | 59-101752 |
| May 22, 1984 | [JP] | Japan | 59-101753 |
| May 22, 1984 | [JP] | Japan | 59-101754 |

[51] Int. Cl.⁴ .............................. H04B 9/00
[52] U.S. Cl. .................... 455/607; 455/613; 400/88
[58] Field of Search ............ 455/606, 607, 601, 612, 455/603, 613, 608, 619, 159, 600; 370/1, 4; 179/82; 400/88

[56] References Cited

U.S. PATENT DOCUMENTS

| 4,021,608 | 5/1977 | Brodeur | 400/88 |
| 4,267,606 | 5/1981 | Stelter et al. | 455/608 |
| 4,313,227 | 1/1982 | Eder | 455/608 |
| 4,328,589 | 5/1982 | Ogita | 455/159 |
| 4,402,090 | 8/1983 | Gfeller et al. | 455/601 |
| 4,456,793 | 6/1982 | Baker et al. | 179/82 |
| 4,499,608 | 2/1985 | Broockman et al. | 455/617 |
| 4,553,267 | 11/1985 | Crimmins | 455/606 |

FOREIGN PATENT DOCUMENTS

| 2823931 | 6/1979 | Fed. Rep. of Germany | 455/606 |
| 0067280 | 6/1981 | Japan | 400/88 |
| 0092157 | 6/1983 | Japan | 455/612 |
| 0105642 | 6/1983 | Japan | 455/612 |
| 0120331 | 7/1983 | Japan | 455/606 |
| 0146150 | 8/1983 | Japan | 455/606 |
| 0007232 | 1/1985 | Japan | 455/607 |

*Primary Examiner*—Robert L. Griffin
*Assistant Examiner*—Andrew J. Telesz, Jr.
*Attorney, Agent, or Firm*—Fitzpatrick, Cella, Harper & Scinto

[57] ABSTRACT

A light communication equipment comprises a photo-sensor for sensing a modulated light signal, a processor for demodulating the light signal sensed by the photo-sensor and processing it, and a keyboard having a plurality of keys for instructing processing to the processor. The processor is housed in a housing and the keyboard is attached to the housing. The photo-sensor has a photo-sensing direction which is on a line extending from a longitudinal line on the keyboard.

19 Claims, 12 Drawing Sheets

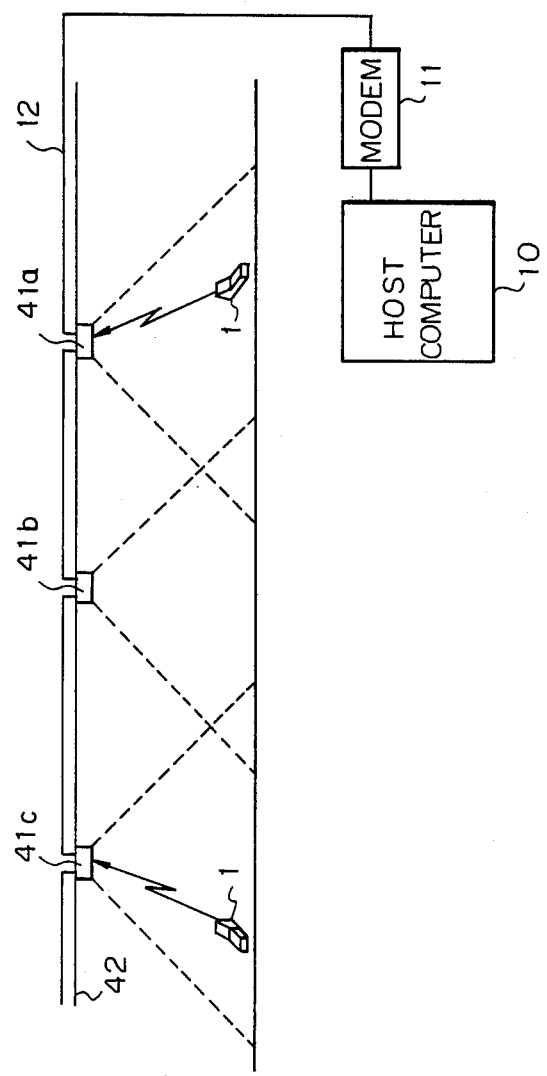

Fig. 13A

| DLE | SOH | HEADING | STX | TEXT | DLE | ETB | BCC |
|---|---|---|---|---|---|---|---|
| 70 | 71 | 72 | 73 | 74 | 60 / 75 | | 76 |

Fig. 13B

| DLE | STX | DLE | ETX | BCC |
|---|---|---|---|---|

| EOT | EOT | SA | SA | ENQ | ENQ |
|---|---|---|---|---|---|
| | | 78 | 79 | | |

| EOT | EOT | PA | PA | ENQ | ENQ |
|---|---|---|---|---|---|
| 77 | | 80 | 79 | | |

63

LIGHT COMMUNICATION EQUIPMENT

BACKGROUND OF THE INVENTION

1. Field of the Invention

The present invention relates to light communication equipment capable of communicating data with other equipment by light space communication.

2. Description of the Prior Art

With advancement of semiconductor technology, various small size and light weight portable terminal devices have been proposed in recent years. They include a device having a data communication function with other devices. A cable or an electric wave is used as a communication medium.

However, when the cable is used as the communication medium, the cost to install the cable is high and a significant restriction is imposed to movement, addition or removal of the device.

When radio transmission is used as the communication medium, there is no restriction on the movement, addition or removal of the equipment but the equipment is easily affected by an electromagnetically induced noise and it malfunctions in a plant where large machinery is operated. Interference to radio and television sets is unavoidable and subject to legal regulation.

Accordingly, light communication which radiates light such as infrared ray to a space to transmit data without using the above communication media has been investigated.

In the past, one-to-one communication has been primarily considered. In order to accurately align optical axes of a light emitting station and a light receiving station, a light emitting/receiving unit is separately housed from an information processing unit and the light emitting/receiving unit is fixed while the information processing unit is rendered movable to a certain extent.

There is no means for effectively determining whether the information processing unit is located within a range permitted for the light communication and such confirmation is made by actually transmitting data.

When a host computer and a terminal communicate with each other by light space communication, a terminal is installed within a light irradiation area of a light communication unit of the host computer which is located on a ceiling of a room and emits and receives light. A light communication unit of the terminal also receives and emits light.

Since the prior art light communication unit of a host computer uses a light emitting diode as a light emitting device, the light illumination angle is small and the light illumination area is small. Thus, the communication range is narrow. As a result, the movable range of the terminal is limited to a small area.

The prior art light communication is primarily intended for one-to-one communication and optical axes of the receiving station and the sending station must be accurately aligned. If one-to-one light communication is effected, a plurality of light from additional sending stations may reach the receiving station and cause interference.

In addition, power consumption in a light emitting unit for the light communication is large and hence it is difficult to provide portable equipment operated by a battery.

In order to effect the light space communication, the light receiving unit and the light emitting unit are necessary, and peripheral circuits are in many cases, discrete circuits. Therefore, there is a limit in reducing the size. Thus, if the light space communication unit is equipped with handy equipment, it is not possible to equip a unit for another function. If the processed data is to be printed out on record paper by a printer, the data should be transmitted to a large system having a printer by light communication.

SUMMARY OF THE INVENTION

It is an object of the present invention to provide an easy-to-use light communication equipment which has a light reception direction along a longitudinal direction of a keyboard.

It is another object of the present invention to provide a handy terminal having a pluggable light emitting-/receiving unit so that the light emitting/receiving unit may be removed when it is not necessary.

It is another object of the present invention to provide a handy light communication terminal having light emitting/receiving means with a variable light emitting-/receiving direction.

It is another object of the present invention to provide light communication equipment which can be mounted on a ceiling.

It is a further object of the present invention to provide a light communication apparatus capable of checking if it is in a light communicatable state or not.

It is still another object of the present invention to provide a light communication system which allows communication among a plurality of terminals without interference.

BRIEF DESCRIPTION OF THE DRAWINGS

FIG. 12, shows a configuration of a light communication system for light communication using the embodiment, FIGS. 13A to 13D show data transmission frames used in the embodiment.

DETAILED DESCRIPTION OF THE PREFERRED EMBODIMENTS

Figure 1A:
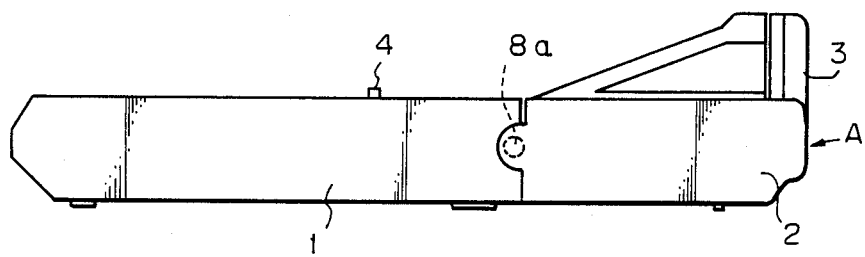
FIG. 1A is an outer side view of one embodiment of the present invention.
Figure 1B:
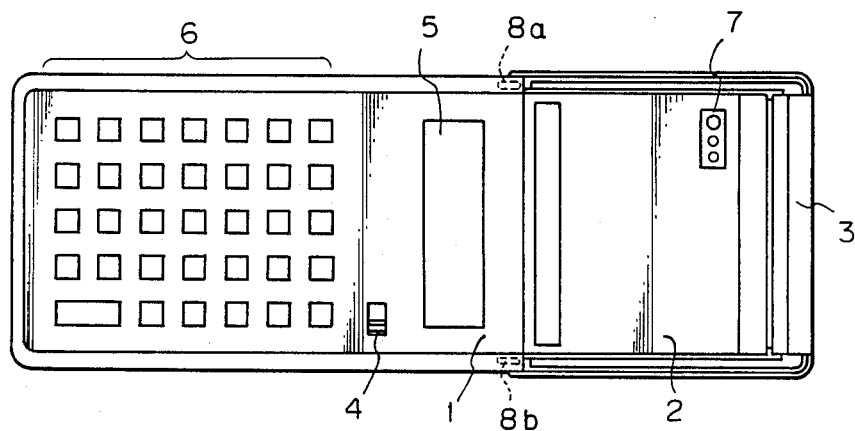
FIG. 1B is an outer top view of the embodiment.

FIGS. 1A and 1B show a side view and a top view of one embodiment of the present invention.

Numeral 1 denotes an information processing unit, numeral 2 denotes a light communication unit, numeral 3 denotes a light emitting/receiving plane of the light communication unit 2, numeral 4 denotes a power switch and numeral 5 denotes a display unit which is a dot matrix (5×7) liquid crystal display having a display capacity of 20 digits×2 lines. Numeral 6 denotes a keyboard having a ten numeral keys, alphabet keys and 22 function keys, and numeral 7 denotes a carrier detect (CD) display on the light communication unit 2 which is lit when the equipment is in a light communication area. The main unit 1 and the light communication unit 2 are connected and fixed to each other by connectors (not shown) and screws 8a and 8b.

The light communication unit 2 is rotatable around the screws 8a and 8b so that the angle of the light omitting/receiving plane 3 is varied. In this manner, the light emitting/receiving plane can be rotated upward as required.

The main unit 1 and the light communication unit 2 are connected to each other by the connectors (not shown). The connector of the light communication unit 2 is mounted on a flexible board.

Figure 2:
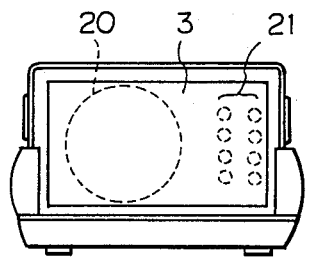
FIG. 2 is an outer view of a light emitting/receiving plane of the embodiment.

FIG. 2 shows an outer view of the light emitting/receiving plane 3 of the light communication unit 2. Numeral 20 denotes a light receiving plane. In the present embodiment, light is focused by a lens in the light receiving plane 20 and the focused light is sensed by a PIN photo-diode. Numeral 21 denotes a light emitting device which comprises eight LED's in the present embodiment to assure a large light output and a wide light beam angle to improve the reliability of the communication.

Figure 3A:
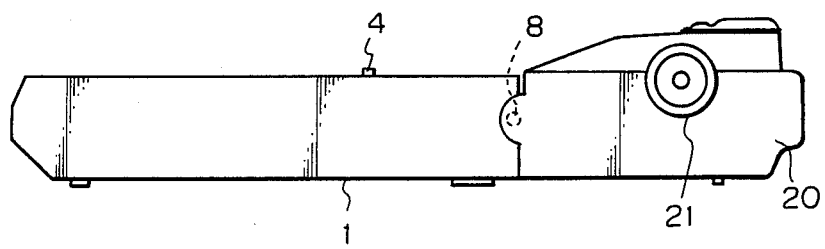
FIG. 3A is an outer side view of the embodiment with a printer mounted thereon.
Figure 3B:
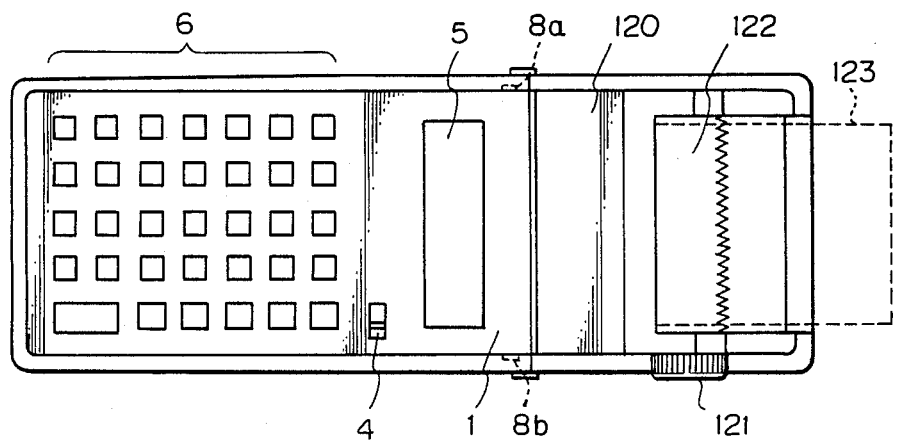
FIG. 3B is an outer top view of the embodiment of FIG. 3A.

FIGS. 3A and 3B show side view and top view of the embodiment to which a printer unit instead of the light communication unit 2 is connected to the information processing unit 1 by the connectors and the screws 8a and 8b. Numeral 120 denotes the printer unit, numeral 121 denotes a paper feed knob, numeral 122 denotes a printer cover and numeral 123 denotes a record paper.

The printer 120 is a thermal dot matrix (5×7) printer having a print capacity of 20 digits/line which corresponds to the number of display digits of the display 5 so that the data displayed on the display 5 are printed out as they are.

Figure 4:
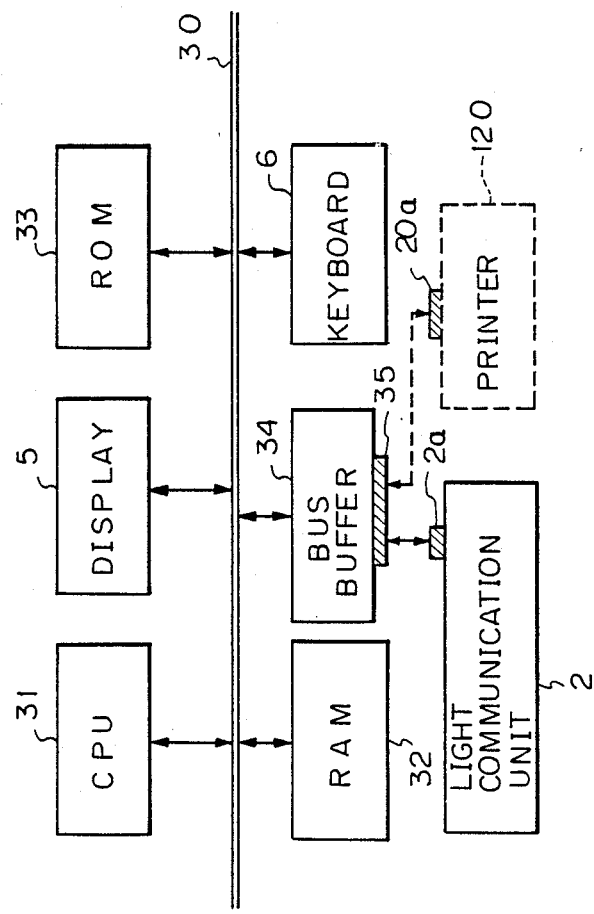
FIG. 4 is a block diagram of the embodiment.

FIG. 4 shows a block diagram of the present embodiment. Numeral 2 denotes the light communication unit shown in FIG. 1, numeral 6 denotes a keyboard, numeral 30 denotes a bus, numeral 31 denotes a microprocessor unit (CPU), numeral 32 denotes a random access memory (RAM), numeral 33 denotes a read-only memory (ROM) which contains a control procedure for the CPU 31 and an interpreter for a user program, numeral 34 denotes a bus buffer including drivers and receivers for signal lines on the bus 30 and numeral 120 denotes the printer unit which may be connected to the bus buffer 34 in place of the light communication unit 2 shown in FIG. 2.

Numeral 35 denotes a connector on the bus buffer 34, numeral 2a denotes a connector on the light communication unit 2, and numeral 20a denotes a connector on the printer unit 120. Either the connector 2a or the connector 20a is connectable to the connector 35.

When the PRINT key of the keyboard 6 is depressed, the CPU 31 supplies the display data for the display 5 to the printer 120 for printing, and when a COMMUNICATION key of the keyboard 6 is depressed, the CPU 31 communicates with other equipment (such as a host computer) through the light communication unit 2.

Figure 5:
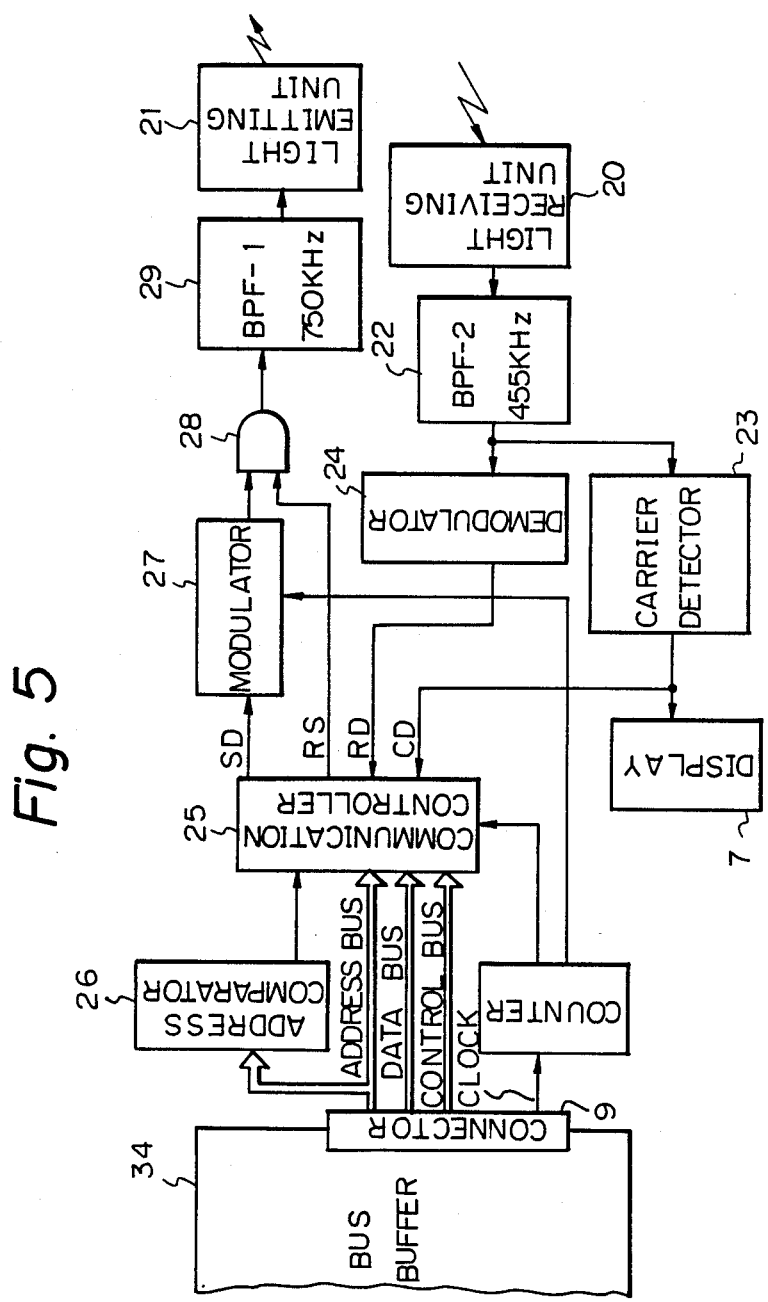
FIG. 5 is a detailed configuration of a light communication unit of the embodiment.

FIG. 5 shows a detailed block diagram of the light communication unit 2. Numeral 9 denotes a connector which connects the bus buffer 34 and the light communication unit 2. The light communication unit 2 is connected to the bus 30 of the main unit through the connector 9. Numeral 22 denotes a band-pass filter 2 (BFP-2) which passes only 455 KHz light of the wavelengths of lights received by the light receiving unit 20. Numeral 23 denotes a carrier detector which detects an output from the BPF-2(22) to turn on the CD display 7. Thus, whether the equipment is in the light communicatable area or not can be readily checked without actually effecting the light communication. Numeral 24 denotes a demodulator which demodulates data sent with a carrier at 455 KHz to produce binary received data (RD), which is sent to a communication controller 25. The communication controller 25 controls the data transmission, adds check bits for transmitted data and checks an error in received data. Numeral 26 denotes an address adder which determines whether data on the bus 30 is control data for the light communication unit 9 from the CPU 31 or not. When the data on bus 30 is the control data for the light communication unit 2, the communication controller 25 is informed. Numeral 27 denotes a modulator which modulates binary transmitted data (SD) from the communication controller 25 and the modulated data output is sent to a band-pass filter 1 (BPF-1) 29 through an AND gate 28 when a request to send the (RS) signal is present. The BPF-1 20 passes therethrough only 750 KHz light which is applied to the light emitting unit 21.

A light communication apparatus which effects the light communication with the information processing unit 1 is now explained in detail.

Figure 6:
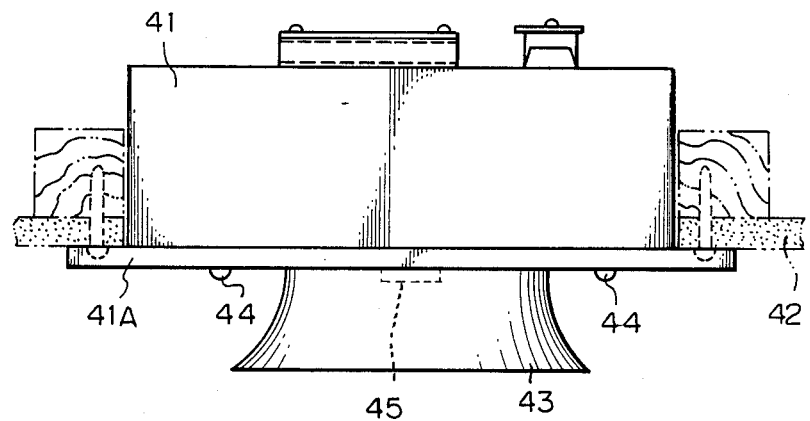
FIG. 6 is a side view of an embodiment of the light communication equipment of the present invention.
Figure 7:
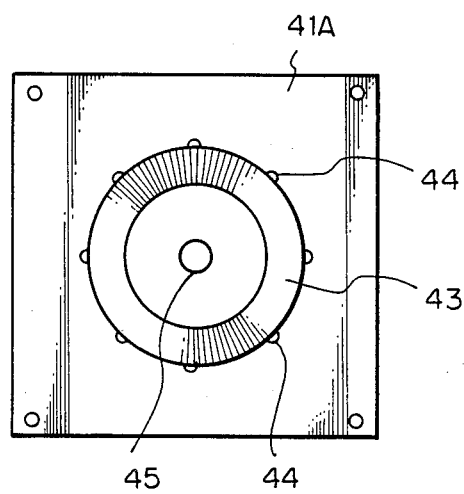
FIG. 7 is a plan view of the light communication equipment.
Figure 8:
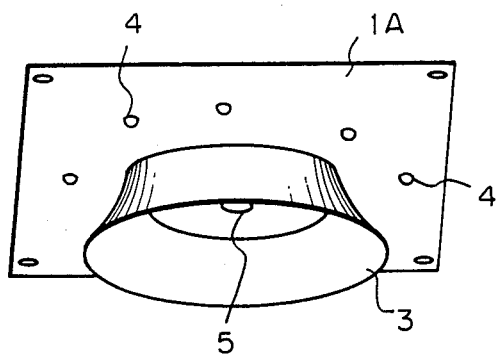
FIG. 8 is a perspective view of the light communication apparatus.

FIG. 6 is a side view of one embodiment of the light communication equipment of the present invention, FIG. 7 is a plan view thereof and FIG. 8 is a perspective view thereof. Numeral 41 denotes a light communication equipment main unit which has a bottom surface 41A thereof fixed to a ceiling 42 by screws. Numeral 43 denotes a cone-shaped diffusion hood formed at a center of the bottom surface 41A. The diffusion hood 43 is shaped to assure high reflection of the light. Numeral 44 denotes light emitting devices such as light emitting diodes (LED's) arranged around the diffusion hood 43 on the bottom surface 41A. As shown in FIG. 7, eight light emitting devices 44 are concentrically arranged around the center of the diffusion hood 43 at a pitch of 45 degrees. The light emitting devices 44 are arranged such that they are partially hidden by the periphery of the diffusion hood 43 when viewed upward. Numeral 45 denotes a photo-sensing device such as a PIN diode arranged at the center of the diffusion hood 43.

Figure 9:
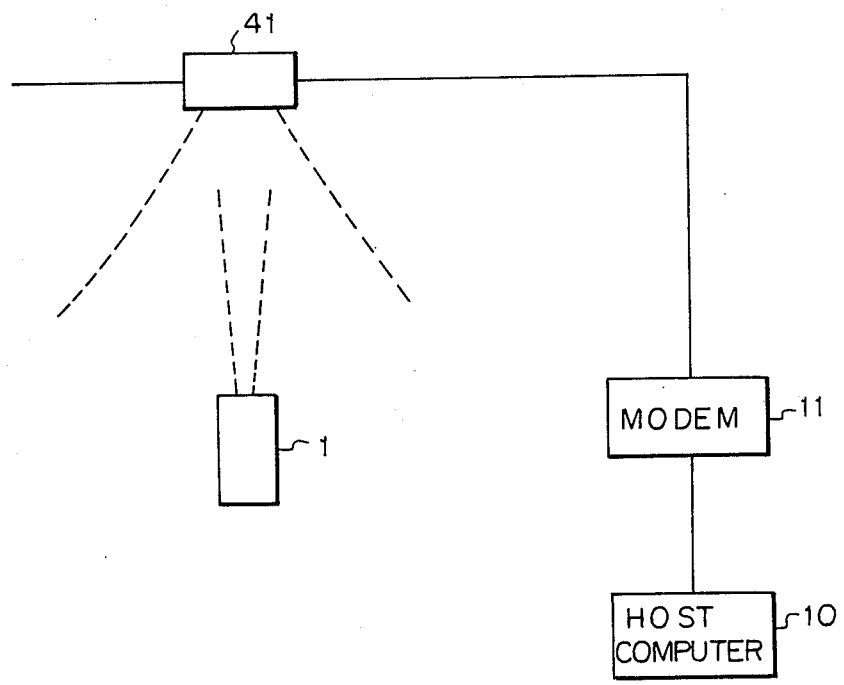
FIG. 9 illustrates an operation status of the light communication equipment.

As shown in FIG. 9, the light communication equipment 41 is connected to a host computer 10 through a modem which demodulates the signal sent from the light communication apparatus 41 and modulates the data sent from the host computer 10. It communicates with the information processing unit 1 in a manner shown in FIG. 9.

Figure 10:
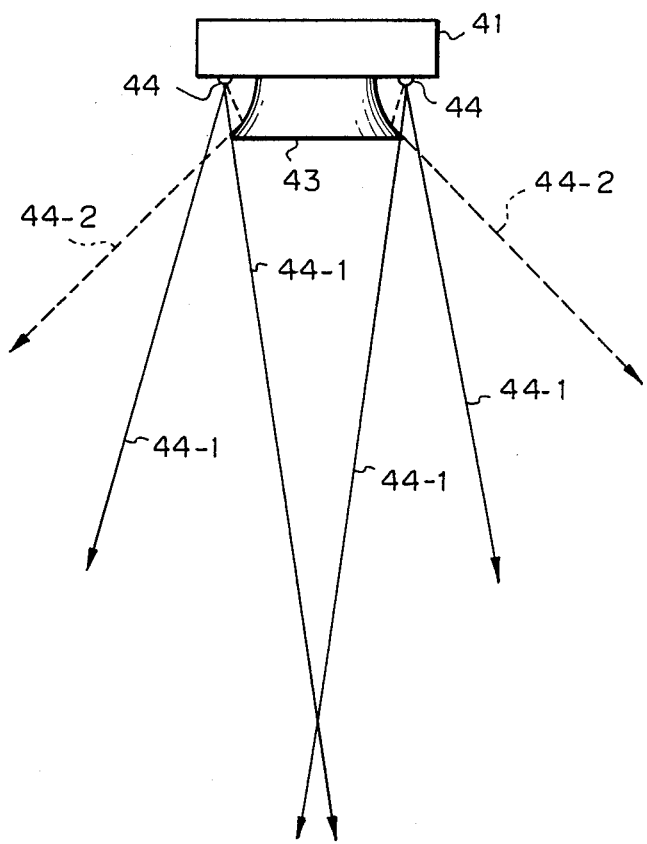
FIG. 10 illustrates an operation of the light communication equipment.

The operation of the light communication equipment 41 is now explained. FIG. 10 shows a status of illumination lights when the light emitting devices 44 of the light communication equipment 41 emits lights. Numeral 44-1 denotes direct lights from the light emitting devices 44. As seen from FIG. 10, the illumination angle of the direct light from the light emitting device such as light emitting diode is not wide. Accordingly, the prior art light communication equipment which irradiates only the direct light from the light emitting device 44 does not have a wide illumination angle. In order to widen the illumination angle, a number of light emitting devices are required.

In the light communication equipment 41 of the present invention, the lights from the light emitting devices 44 are reflected by the outer surface of the diffusion hood 43 so that reflected lights 44-2 are spread out. As a result, the illumination angle is much larger than that of the prior art and a smaller number of light emitting devices 44 are required.

Figure 11A:
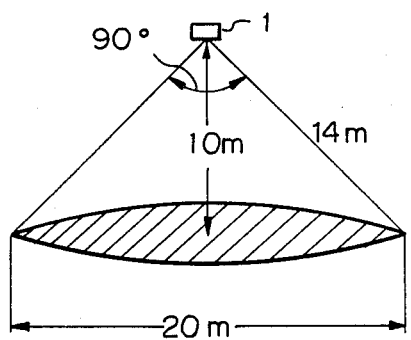
FIGS. 11A and 11B illustrate illumination areas of the light communication equipment.
Figure 11B:
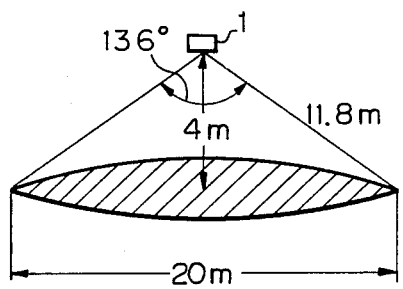

FIGS. 11A and 11B show the illumination areas of the light communication equipment of the present embodiment. In the light communication equipment 41 of the present embodiment, an effective distance of the light communication is approximately 14 m. At a position displaced by 10 m from a ceiling, the illumination angle is 90° and the illumination length is 20 m, as shown in FIG. 11A. At a position displaced by 4 m from the ceiling, the illumination angle is 136° and the illumination length is 20 m.

The light from the terminal 12 is sensed by the photosensing devices 45 and the sensed signals are sent to the host computer 10.

FIG. 12 shows a configuration for the light communication by a master station which communicates with the information processing units (slave stations). Numeral 10 denotes a host computer at the master station, numeral 11 denotes a modem, numeral 12 denotes a communication cable, and numerals 14a to 41c denote master station satellites which are mounted on a wall or a ceiling of a building. In the present embodiment, up to ten satellites may be connected to one modem. Each master station satellite has its own address so that each satellite can be independently operated. Numeral 1 denotes slave stations. Any number of slave stations can communicate with the master stations so long as they are located in an infrared ray reachable area. In the present embodiment, a transmission rate is 2400 BPS, transmission control is polling/selecting type by the master station in a semi-duplex mode, the control is done by software to prevent a long response time, and up to ten slave stations can be connected to one modem 1.

The modem 11 modulates the communication data sent from the host computer 10 by a carrier at 455 KHz and sends the modulated data to the cable 12, and receives the communication data sent from the cable and modulated by a carrier at 750 KHz, demodulates it and sends the demodulated data to the host computer 10.

The master station satellites 41 cause the data light emitting units modulated by the 455 KHz carrier from the cable 12 to emit the lights and send the cable modulated by the 750 KHz light received by the photo-sensing unit to the cable 12.

FIGS. 13A to 13D show data communication frames between the master station and the slave station. In the present embodiment, the character code is JIS-C6220 8-unit code. One-bit even parity code is added to the eight bits to form an actual transmit code. In FIG. 13A, numeral 60 denotes a data communication frame which comprises DLE 70, SOH 71, heading information 72, STX 73, text information 74, DLE, ETB 75 and block check character (BCC) 76. The text information 74 is of a length of up to 256 bytes. The SOH 71 and the heading information 72 are added as required.

In FIG. 13B, numeral 61 denotes a final transmission block of the data communication frame. The frame without the text information 74, SOH 71 and heading 72 shown in FIG. 13A is sent out as the final block of the data communication.

In FIG. 13C, numeral 62 denotes a selecting frame. An EOT 77, a selecting address (SA) 78 and an ENQ 79 are transmitted to improve reliability of the transmission.

In FIG. 13D, numeral 63 denotes a polling frame. The EOT 77, a polling address (PA) 80 and the ENQ 79 are transmitted.

A response system is an alternate response by ACK-.ACK and NAK.NAK.

Figure 14A:
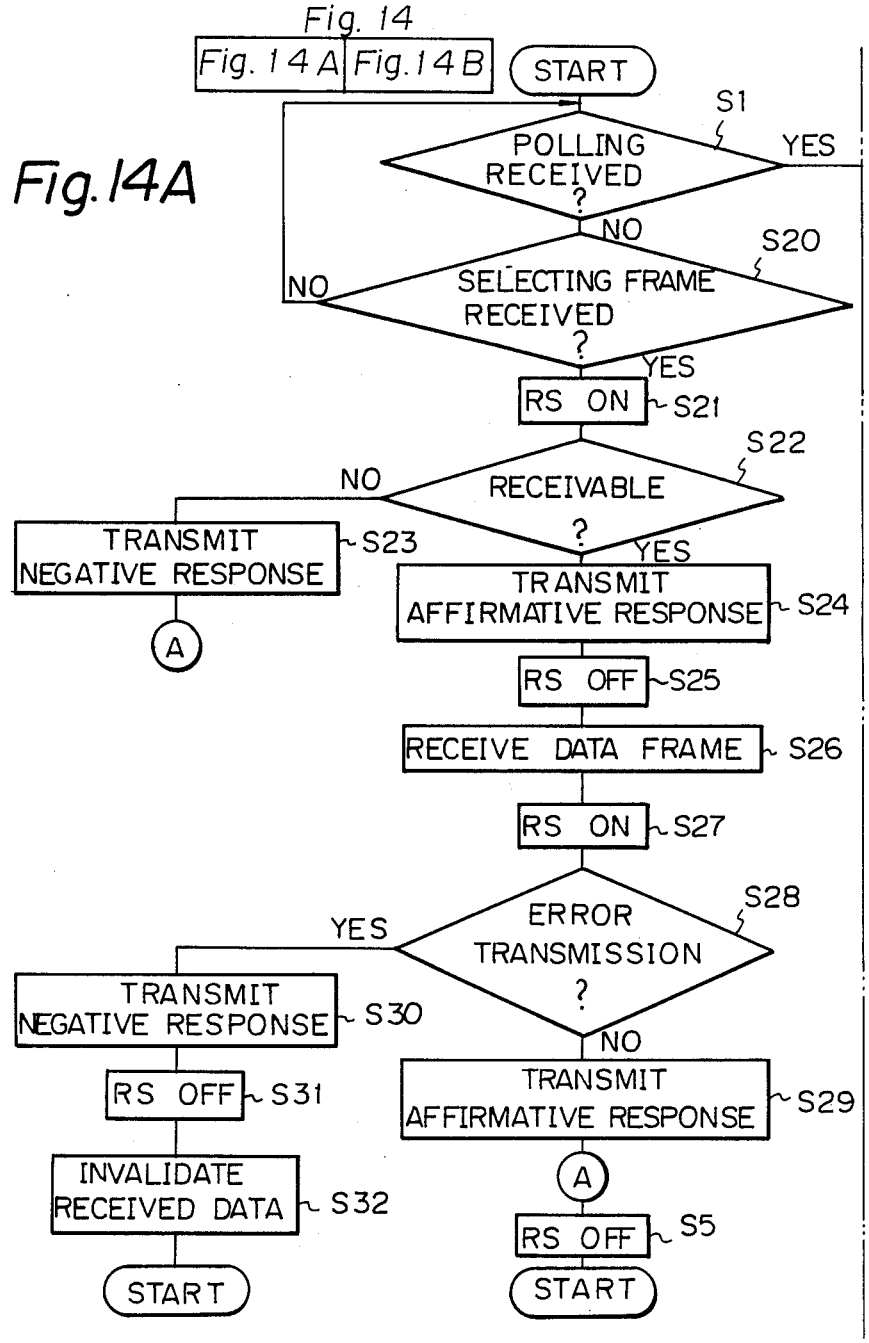
FIGS. 14A and 14B show a data transmission control flow chart of the embodiment.
Figure 14B:
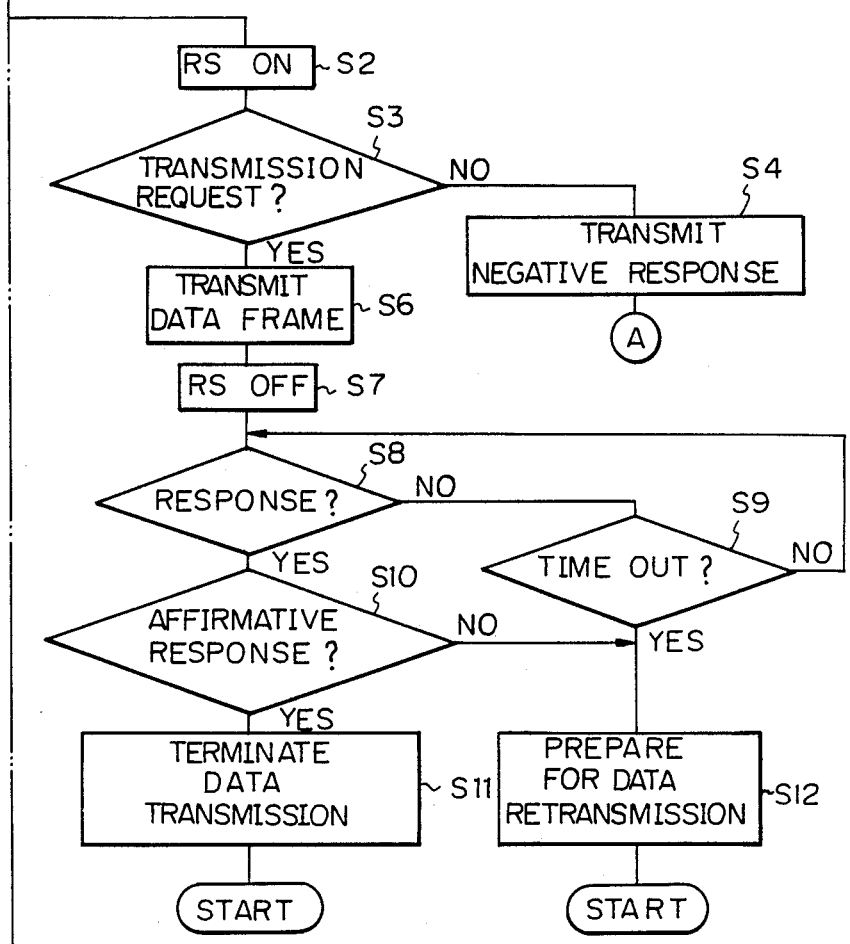

Referring to a transmission control flow chart for the slave station shown in FIG. 14, the transmission control in the present embodiment is explained.

The host computer 10 at the master station always emits the 455 KHz carrier from the light emitting unit of the master station satellite 41 and modulates the 455 KHz carrier only when the transmit data is present. Accordingly, the slave station 1 can always receive the carrier sent from the master station. Thus, by checking the CD display 7 shown in FIG. 1B, whether the slave station is in the communicatable area with the master station or not can be determined without effecting actual light communication.

The master station continuously polls the slave stations and selects the slave stations as required. The polling is effected by the polling frame shown in FIG. 13D, and the selecting is effected by the selecting frame shown in FIG. 13C. When the master station receives the 750 KHz carrier from the slave station, it communicates with the slave station. The processing during the communication is common to the master station and the slave station.

The communication controller 25 of the light communication unit 2 at the slave station monitors the reception of the polling frame or the selecting frame in steps S1 and S20. If the polling frame addressed to its own station is received, the process proceeds from the step S1 to a step S2 where the RS signal is set to enable the gate 28 to allow the light emitting unit 21 to emit the 750 KHz carrier. The presence of the request to transmit by the CPU 31 is checked, and if it is not present, a negative response is modulated at 750 KHz by the modulator and the modulated light is emitted from the light emitting unit 21 in a step S4. In a step S5, the RS signal is reset to interrupt the sending of the carrier, and the process returns to the step S1.

This is effective only when the light receiving unit 20 and the light emitting unit 21 of the slave station are exactly directed to the master station satellite 41. If the slave station is at a position at which it cannot receive the polling/selecting from the master station, the master station starts the polling/selecting to the next slave station after a predetermined time period.

If the request to transmit is present in the step S3, the process proceeds to a step S6 where the data frame is transmitted in accordance with the data communication format shown in FIG. 13A. After the transmission, the RS signal is reset in a step S7 to stop the transmission of the carrier.

The transmission of the data from the slave station is usually effected by depressing the TRANSMISSION key (not shown) on the keyboard 6. The operator enters necessary information by the keys on the keyboard 6, and when the operator is ready to transmit the data, he/she directs the light emitting/receiving plane 3 to one of the master station satellites 53 and then depresses the TRANSMISSION key.

When the transmission of the data frame 60 ends in the step S7, a response from the master station to the transmitted data is monitored in steps S8 and S9, and if the response in received, the process proceeds from the step S8 to a step S10 and the type of the response is checked. If it is an affirmative response, the transmission of the data is terminated in a step S11 and the process returns to the step S1 where the next polling is monitored if the next transmit data is present.

If the response is not the affirmative response in the step S10, it indicates that the transmitted data was not correctly received by the master station. The data for retransmission is prepared in a step S12 and the process returns to the step S1.

If a time-out occurs in the step S9, the process proceeds to the step S12 to retransmit the data.

In a step S20, if the selecting command to its own station is received, the process proceeds to a step S21 where the RS signal is set to send out the carrier, and in a step S22, whether the data from the master station is receivable or not is checked. If it is not receivable, a negative response is sent in a step S23 and the process proceeds to a step S5. If the data is receivable, the process proceeds from the step S22 to a step S24 where an affirmative response is sent. The RS signal is reset in a step S25 and the data frame sent from the master station is received in a step S26. In a step S28, any reception error is checked by the parity bit or the BCC code in the data frame, and if there is no error, an affirmative response is sent in a step S29 and the process proceeds to the step S5 where the RS signal is turned off and the light emission is stopped. The process then returns to the step S1.

If there is an error in the step S28, a negative response is sent in a step S30 and, in a step S31, the RS signal is reset to stop the light emission 21 of the light emitting unit 21, and the received data is invalidated in a step S32. Then, the process returns to the step S1.

The transmit data is actually transmitted a predetermined time after the light emitting unit 21 emitted the light by the setting of the RS signal.

Since the slave station emits the light only when it is actually sends the data, unnecessary light does not reach the master station, and the power consumption in the slave station is reduced.

What is claimed is:

1. Light communication equipment comprising:
    photo-sensing means for sensing a modulated light signal;
    processing means for demodulating and processing the light signal sensed by said photo-sensing means;
    keyboard means including a plurality of keys for instructing processing by said processing means;
    housing means for housing said processing means therein and including said keyboard means; and
    connecting means for movably mounting said photo-sensing means on said housing means for varying the photo-sensing direction of said photo-sensing means.

2. A light communication equipment according to claim 1 wherein said photo-sensing means is a PIN photo-diode.

3. A light communication equipment according to claim 1 further comprising light emitting means for light-modulating data processed by said processing means.

4. A light communication equipment according to claim 1 wherein said equipment is of a size portable by one hand.

5. A handy terminal comprising:
    input means for inputting data;
    processing means for processing the data from said input means and additional data;
    a handy terminal housing having said input means and said processing means therein;
    a printer detachably mountable on said handy terminal housing, wherein said printer is capable of printing data supplied from said processing means when said printer is mounted on said handy terminal housing;
    light emitting/receiving means detachably and movably mountable on said handy terminal housing, wherein said light emitting/receiving means is capable of transmitting and receiving data to and from said processing means when said light emitting/receiving means is mounted on said handy terminal housing; and
    a connector for connecting either one of said printer or said light emitting/receiving means to said handy terminal housing.

6. A handy terminal according to claim 5 where a light emitting/receiving direction of said light emitting/receiving means is variable.

7. A handy terminal according to claim 5 wherein said light emitting/receiving means includes light modulation/demodulation means.

8. A handy light communication terminal comprising:
    input means for inputting data;
    processing means for processing the data from said input means;
    a handy terminal housing having said input means and said processing means therein; and
    light emitting/receiving means rotatably mounted on said handy terminal housing and having a variable light emitting/receiving direction.

9. A handy light communication terminal according to claim 8 wherein said light emitting/receiving means includes light modulation/demodulation means.

10. A handy light communication terminal according to claim 8 wherein said handy terminal housing is of a size portable by one hand.

11. A handy light communication terminal according to claim 8 wherein said light emitting/receiving means includes an LED and a PIN photo-diode.

12. A ceiling mount type light communication equipment comprising:
    a base plate of said light communication equipment for fixing said equipment to a ceiling;
    light emitting means mounted on said base plate for emitting a modulated light toward a floor;
    diffusion means mounted on said base plate for diffusing the light emitted by said light emitting means; and
    photo-sensing means arranged within said diffusion means for sensing a modulated light sent from other equipment.

13. A ceiling mount type light communication equipment according to claim 12 wherein said light emitting means includes a plurality of LED's.

14. A ceiling mount type light communication equipment according to claim 12 wherein said diffusion means is substantially cone shaped, and said light emitting means includes a plurality of LED's arranged around said diffusion means.

15. A ceiling mount type light communication equipment according to claim 12 wherein said diffusion means is substantially cone shaped.

16. A ceiling mount type light communication equipment according to claim 12 wherein said diffusion means is substantially cone shaped and said photo-sensing means is mounted in said diffusion means.

17. A light communication system for communication among a plurality of pieces of equipment comprising:
 light emitting means for transmitting data, in the form of modulated light, for designating one of said plurality of pieces of equipment as the other party of communication;
 light receiving means movably mounted on each of said plurality of pieces of equipment for receiving light generated by said light emitting means;
 discriminating means mounted on each of said plurality of pieces of equipment for discriminating whether each of said plurality of pieces of equipment has received data for designating itself as the other party of communication upon receipt of data in the form of modulated light from said light emitting means by said light receiving means; and
 control means mounted on each of said plurality of pieces of equipment for enabling said equipment to be in a light communicable state when said equipment determines that said equipment has been designated as the other party of communication, as the result of discrimination by said discriminating means.

18. A light communication system according to claim 17, wherein said discriminating means is mounted on a handy terminal housing.

19. A light communication system according to claim 17 wherein said light emitting means includes a plurality of LED's.

* * * * *

UNITED STATES PATENT AND TRADEMARK OFFICE
CERTIFICATE OF CORRECTION

PATENT NO. : 4,856,090
DATED : August 8, 1989
INVENTOR(S) : SHIGEHISA KITANI ET AL.

It is certified that error appears in the above-identified patent and that said Letters Patent is hereby corrected as shown below:

AT [30] FOREIGN APPLICATION PRIORITY DATA

"May 22, 1984 [JP] Japan...59-101740" should read
--May 22, 1984 [JP] Japan...59-101750--.

AT [56] REFERENCES CITED

U.S. Patent Documents, "4,456,793 6/1982 Baker et al."
should read --4,456,793 6/1984 Baker et al.--.

COLUMN 5

Line 37, "numerals 14a to 41c" should read
--numerals 41a to 41c--.
Line 60, "cable" (second occurrence) should read
--data--.

Signed and Sealed this

Nineteenth Day of June, 1990

Attest:

HARRY F. MANBECK, JR.

Attesting Officer

Commissioner of Patents and Trademarks